United States Patent [19]

Hosoi

[11] Patent Number: 5,168,429
[45] Date of Patent: Dec. 1, 1992

[54] ELECTRONIC APPARATUS HAVING A SLIDABLE PAWL FOR REMOVABLY CONNECTING A DISPLAY HOUSING TO A BASE HOUSING

[75] Inventor: Takashi Hosoi, Ome, Japan

[73] Assignee: Kabushiki Kaisha Toshiba, Kawasaki, Japan

[21] Appl. No.: 853,855

[22] Filed: Mar. 19, 1992

Related U.S. Application Data

[60] Continuation of Ser. No. 706,361, May 28, 1991, abandoned, which is a division of Ser. No. 406,614, Sep. 12, 1989, abandoned.

[30] Foreign Application Priority Data

Sep. 13, 1988 [JP] Japan ............................... 63-229358

[51] Int. Cl.$^5$ .................... H05K 7/10; H01R 3/00; G06F 1/00
[52] U.S. Cl. .................... 361/395; 361/380; 439/165; 439/345
[58] Field of Search ............... 439/164, 165, 345, 347; 364/708; 361/380, 390, 391, 392, 393, 394, 395, 399

[56] References Cited

U.S. PATENT DOCUMENTS

| | | | |
|---|---|---|---|
| 4,680,674 | 7/1987 | Moore | 364/708 X |
| 4,730,364 | 3/1988 | Tat-Kee | 364/708 X |
| 4,858,162 | 8/1989 | Kieffer et al. | 364/708 |
| 4,864,523 | 9/1989 | Sasaki | 364/708 |
| 4,894,792 | 1/1990 | Mitchell et al. | 364/708 |
| 4,926,365 | 5/1990 | Hsieh | 364/708 |

Primary Examiner—Leo P. Picard
Assistant Examiner—Michael W. Phillips
Attorney, Agent, or Firm—Cushman, Darby & Cushman

[57] ABSTRACT

The portable electronic apparatus comprises a body, a display unit, rotary shaft and a slide shaft. The body includes a keyboard, a main power supply for supplying a voltage, a first connector electrically connected to the main power supply and a top cover having a connector hole for exposing the first connector. The display unit includes a second connector electrically and mechanically connected to the first connector and a flat panel display supplied the voltage from the main power supply through the first connector and the second connector. The rotary shaft rotates the display unit between a first position for covering the keyboard and a second position for operating the keyboard. The slide shaft engages the rotary shaft and mechanically connects the display unit to the body in a third position and releases the engagement and mechanical connection between the display unit and the body in a fourth position. The apparatus has good carrying ability and portability when the display unit is detached from the body, is excellent in producibility of the apparatus, and has less chance of electric shock to the operator and less electric shock to the apparatus.

14 Claims, 9 Drawing Sheets

ELECTRONIC APPARATUS HAVING A SLIDABLE PAWL FOR REMOVABLY CONNECTING A DISPLAY HOUSING TO A BASE HOUSING

This is a continuation of application Ser. No. 07/706,361, filed on May 28, 1991, which was abandoned upon the filing hereof and which was a Rule 60 division of Ser. No. 07/406,614, filed Sep. 12, 1989, now abandoned.

BACKGROUND OF THE INVENTION

1. Field of the Invention

This invention relates to a portable electronic apparatus such as computers or word processors of the lap-top type, etc., and more particularly to a portable electronic apparatus having a flat panel display unit removably attached thereto.

2. Description of the Related Art

In recent years, portable computers or portable word processors of the lap-top type, etc. having a flat panel display unit have been popularized.

Among such lap-top portable electronic apparatus, there have appeared portable electronic devices constructed so that a low voltage driven LCD (Liquid Crystal Display) unit of a flat panel display unit is detachable or demountable from the body as shown in U.S. Pat. No. 4,749,364. In such display removably attached portable electronic devices, a connector on the body side for electrically connecting the body and the LCD unit is provided in a socket rotatable relative to the body. When the LCD unit is mechanically connected to the socket, it can be rotated, by the rotational operation of the socket, between the position where the keyboard is covered and the position where an operation is made by an operator. With these display detachable portable electronic devices, when the LCD unit is detached from the body and the body and a cathode ray tube (CRT) display are electrically connected, a display on the CRT can be conducted. Accordingly, when such display removably attached portable electronic apparatus is employed, operations of plural kinds of displays can be carried out with a single body in a manner that the LCD unit is used when there is a need to frequently carry about the body, and that a CRT display is used when a user wished to look at the pictorial image by a color display.

Since the display removably attached portable electronic apparatus of the structure shown in U.S. Pat. No. 4,749,364 is such that the connector on the body side is provided within the rotatable socket, it has the following drawbacks. First, without the attached LCD display, it is unnecessary for the rotatable socket to remain in the body. Since the rotatable socket still remains within body after the LCD has been actually removed therefrom, the socket may be incompatible with another type of display such as a CRT and therefore prevent the user from attaching this different type of display. Secondly, since it is required that a signal cable for electrically connecting the connector and a central processing unit (CPU) provided in the body and /or a power supply cable for delivering a power from the body to the LCD unit are disposed within the rotary shaft between the socket and the body, producibility is poor at the time of assembling the apparatus. Thirdly, if a unit using a high power supply voltage of the order of 200 volts such as a plasma display is used as a flat panel display unit, such a high power supply voltage is delivered through the connector within the socket and there might occur a danger such that an operator receives an electric shock if his hands erroneously come into contact with the neighborhood of the socket. Fourthly, if a flat panel display unit of a high power supply voltage is used, such a high voltage is delivered to the connector, and this high voltage is instantaneously entered into the display unit or is cut off from the display unit at the time of attachment and/or detachment of the display unit, rendering a great electric shock to the body or the display.

SUMMARY OF THE INVENTION

This invention has been made in order to improve the above-mentioned problems.

A first object of this invention is to provide a portable electronic apparatus such that no unnecessary portion remains in the body when the flat panel display is detached therefrom.

Another object of this invention is to provide a display removably attached portable electronic apparatus having a good producibility at the time of assembling.

A further object of this invention is to provide a display removably attached portable electronic apparatus having less danger of electric shock even when the apparatus is of the type using a flat panel display unit of a high power supply voltage.

A still further object of this invention is to provide a display removably attached electronic apparatus constructed so that a less electric shock is applied to the body or the display unit at the time of fitting the display unit into the body and detaching it therefrom.

To achieve the above objects, a portable electronic apparatus according to this invention comprises a body, a display unit, rotation means and connecting means. The body includes a keyboard, a main power supply for supplying a voltage, a first connector electrically connected to the main power supply and a top cover having a connector hole for exposing the first connector. The display unit includes a second connector electrically and mechanically connected to the first connector and a flat panel display to which is supplied the voltage from the main power supply through the first connector and the second connector. The rotation means rotates the display unit between a first position for covering the keyboard and a second position for operating the keyboard. The connecting means engages to the rotation means and mechanically connects the display unit to the body in a third position and releases the engagement and mechanical connection between the display unit and the body in a forth position.

As constructed above, this invention can provide a portable electronic apparatus which has a good carrying ability and portability when the display unit is detached from the body, which is excellent in producibility of the apparatus, and which has less chance of electric shock to the operator and less actual shock to the apparatus.

DESCRIPTION OF THE PREFERRED EMBODIMENT

A preferred embodiment according to this invention will be described in detail with reference to the attached drawings.

Figure 1:
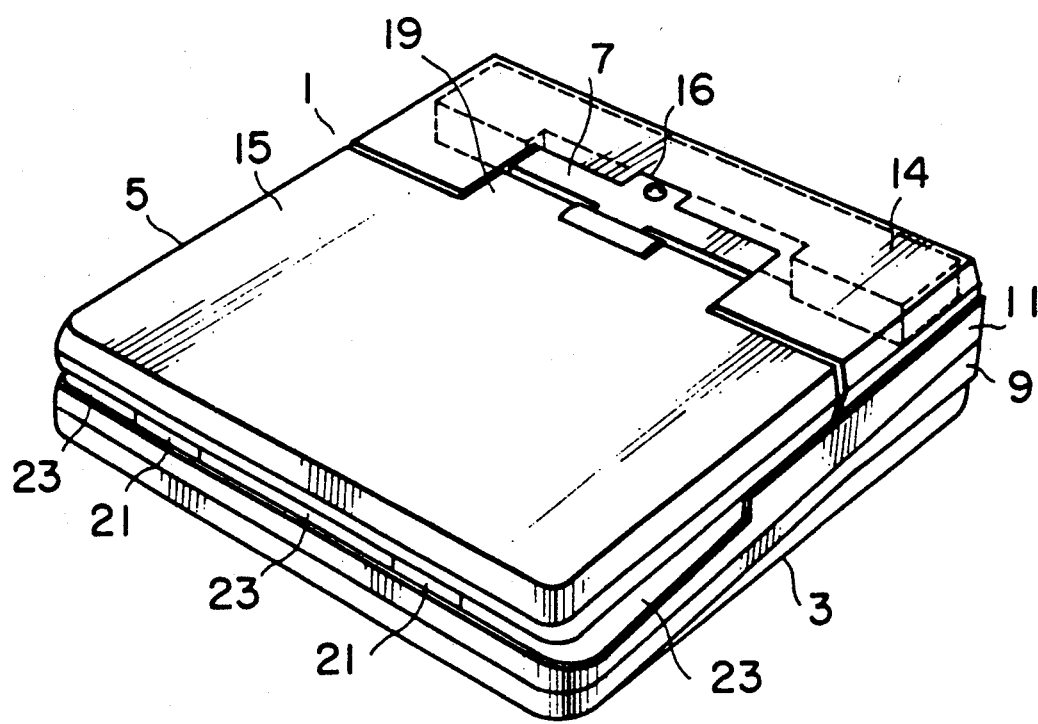
FIG. 1 is a front and perspective view wherein a display unit of a portable computer to which this invention is applied is in a closed state on the body.
Figure 2:
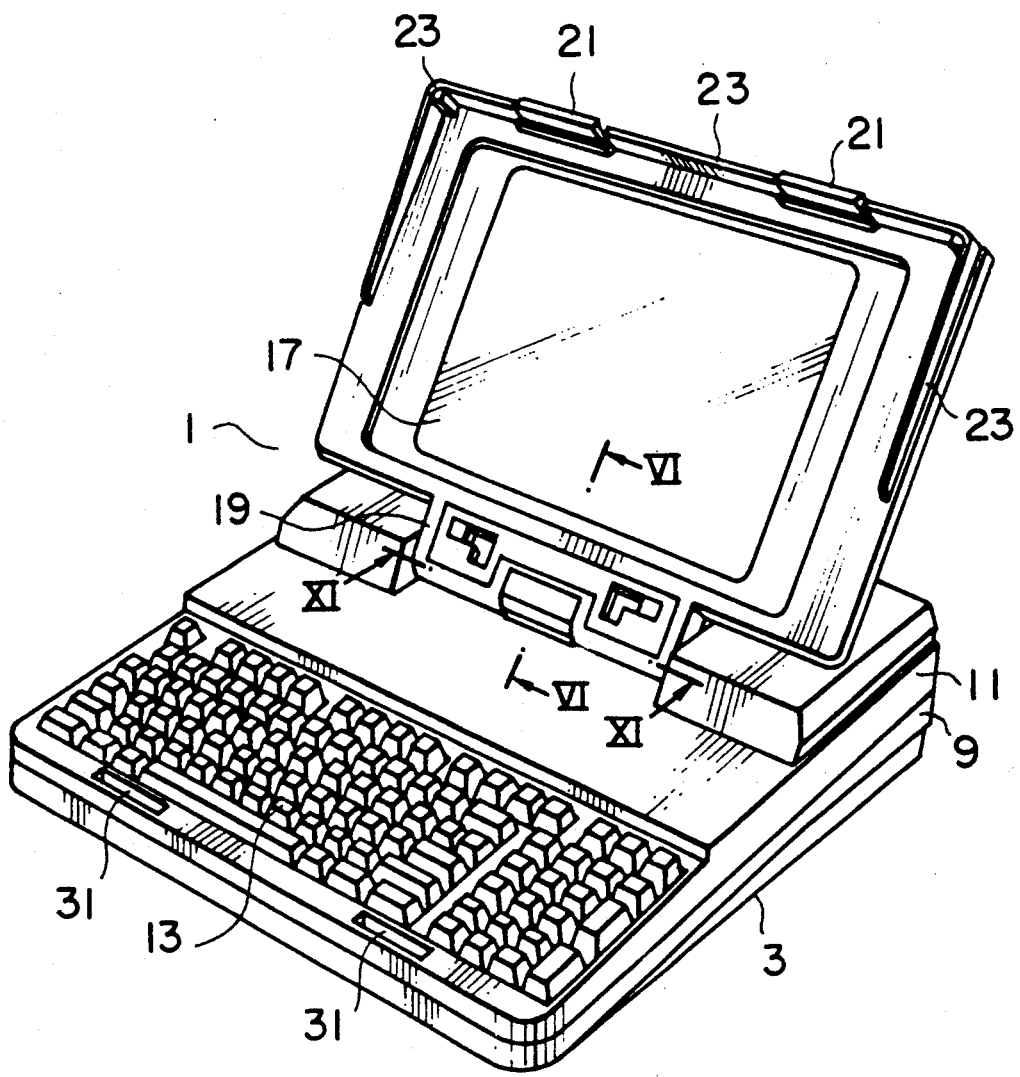
FIG. 2 is a front and perspective view of a portable computer in which the display unit is in an opened state.

FIG. 1 is a front and perspective view of a portable computer in which the display unit is closed on the body, and FIG. 2 is a front and perspective view of a portable computer in which the display unit is opened so that the keyboard is exposed.

The portable computer 1 includes a body 3, a display unit 5, and a voltage conversion unit 7 for converting a low voltage power to a high voltage power. The body 3 includes a base 9 and a top cover 11. The base 9 includes a keyboard 13 provided at the front portion thereof and a main power supply 14 for delivering a low voltage power provided at the rear portion thereof. The display unit 5 includes a back surface 15, plasma flat panel display 17 for displaying data thereon, a connection section 19 for mechanically and rotatably connecting the display unit 5 to the top cover 11 and the voltage conversion unit 7, a pair of latch pawls 21 for latching the display unit 5 onto the body 3, and a side cover 23 for covering a gap between the body 5 and the display unit 5 produced when the display unit 5 is closed on the body 3 so as to cover the keyboard 13.

Figure 3:
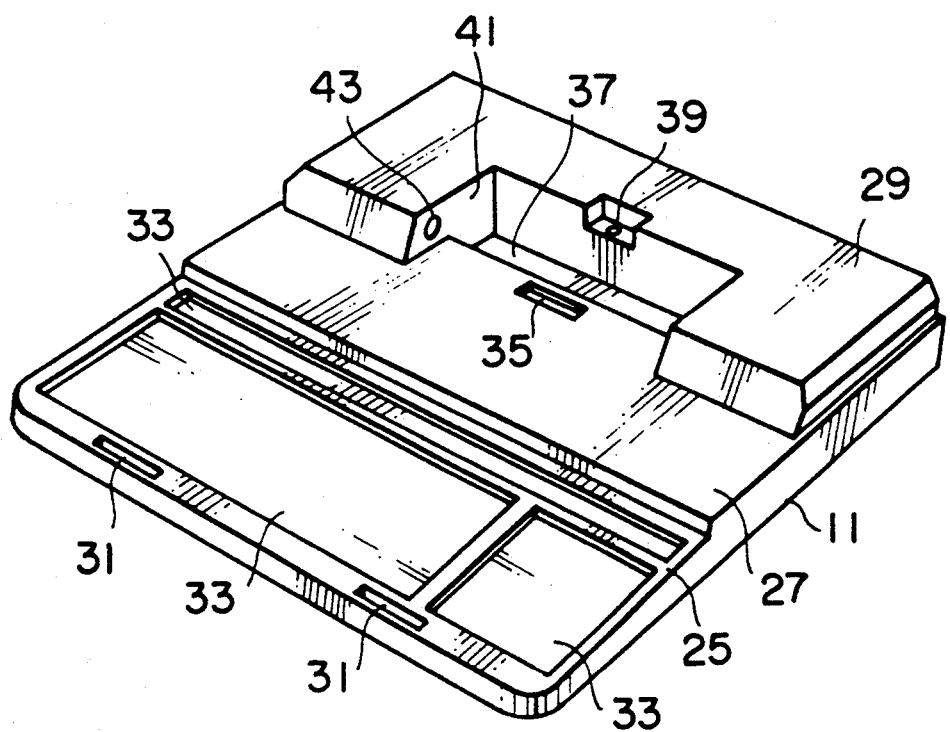
FIG. 3 is a perspective view of a top cover.

FIG. 3 is a perspective view of the top cover.

The top cover 11 includes a front top 25, a center top 27, and a rear top 29. A pair of latch grooves 31 for engaging the latch pawls 21 are formed at the front end portion of the front top 25, and an opening 33 for exposing the keyboard 13 is formed in the central portion thereof. A connector hole 35 for exposing a connector on the body side which will be described later is formed in the central portion of the center top 27. A mount surface 37 for mounting the voltage conversion unit 7 is formed on the rear end of the center top 27. In order that top portions of the rear top 29 and the voltage conversion unit 7 are substantially flush with each other when the voltage conversion unit 7 is connected onto the body 3, the mount surface 37 is formed to have a height lower than the center top 27. A screw hole 39 for fixing the voltage conversion unit 7 to the top cover 11 is formed in the central portion of the rear top 29. In order that the rear top 29 and the back surface 15 of the display unit 5 are substantially flush with each other when the display unit 5 is closed on the body so as to cover the keyboard 13, the rear top 29 is formed to have a height higher than those of the center top 27 and the front top 25. A pair of axial holes 43 for exposing a rotary shaft which will be described later are formed at an inside side surface 41 between the canter top 27 and the rear top 29.

Figure 4:
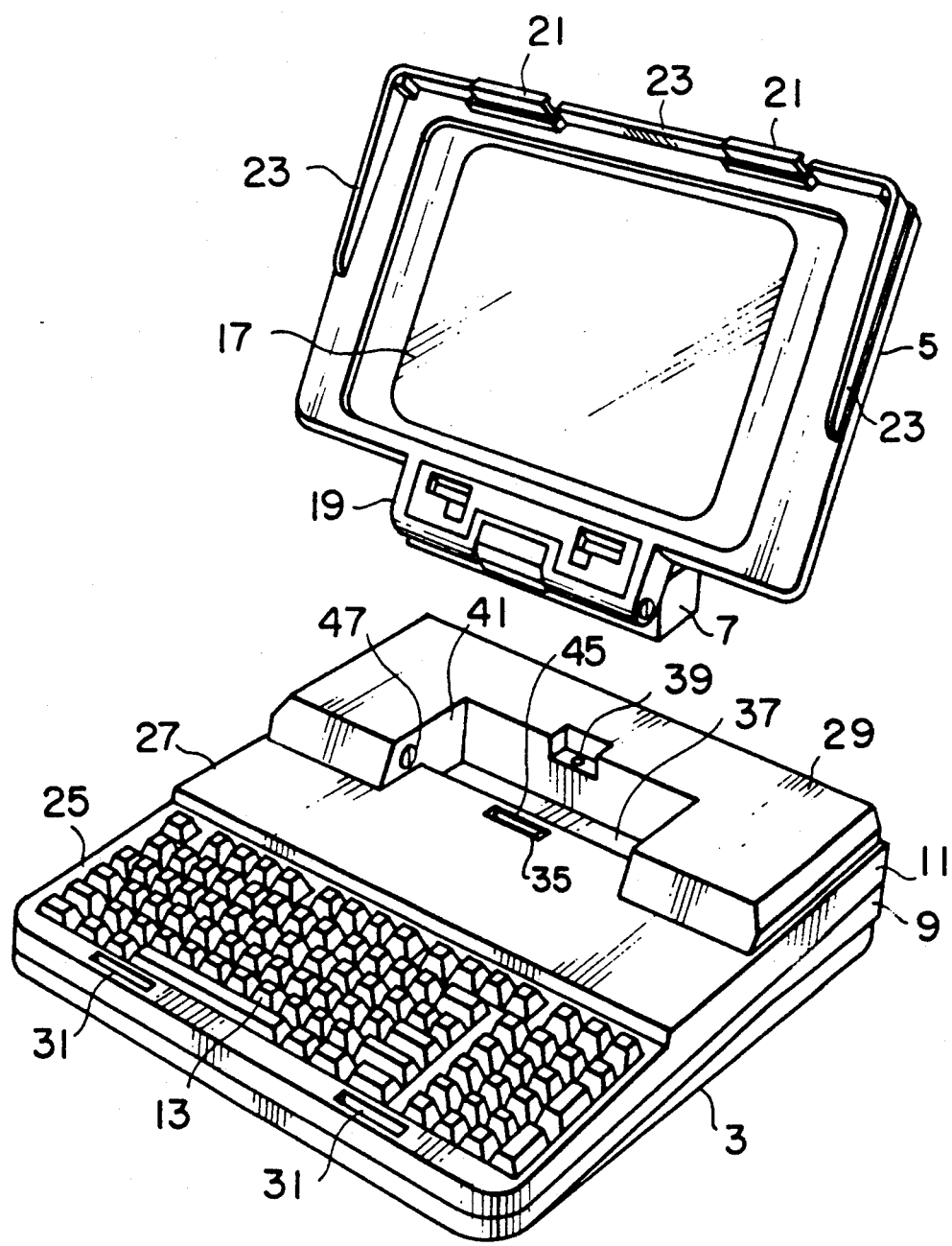
FIG. 4 is a front and perspective view of a portable computer in which the display unit is detached from the body.

FIG. 4 is a front and perspective view of a portable computer in which the display unit is detached from the body.

A connector 45 on the body side for electrically connecting the side of the body 3 and the side of the display unit 5 and the voltage conversion unit 7 is provided so that it is exposed from the connector hole 35. Rotary shafts 47 for rotating the display unit 5 between a first position where the keyboard 13 is covered and a second position for operating the portable computer 1 while looking at the plasma flat panel display 17 are provided so that they are exposed from the axial holes 43, respectively.

Figure 5:
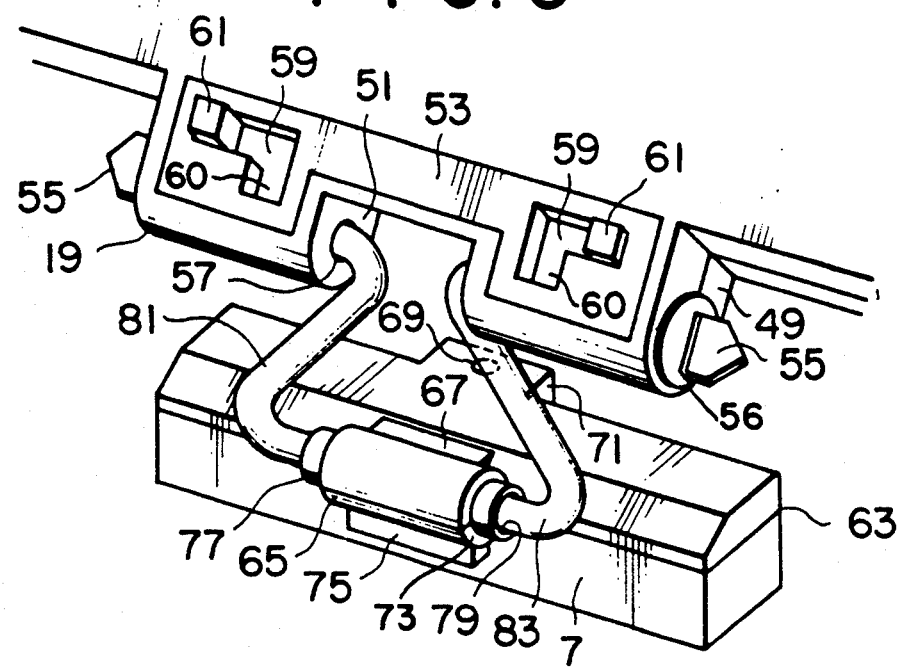
FIG. 5 is and exploded and enlarged view of an attachment portion of the display unit and the body.

FIG. 5 is an enlarged and exploded view of the portion in the vicinity of the attachment of the display unit and the voltage conversion unit.

The connection section 19 of the display unit 5 includes a pair of outside side surfaces 49, a pair of inside side surfaces 51, and a front surface 53. Slide pawls 55 which engage the rotary shafts 47 to mechanic..ally connect the display unit 5 and the body 3 project through slide pawl holes 5b in the outside side surfaces 49, respectively. Circular holes 57 for rotatably connecting the display unit 5 and the voltage conversion unit 7 are provided at the inside side surfaces 51, respectively. A pair of guiding grooves 59 and stopper grooves 60, continuous with the guiding grooves 59, are formed at the front surface 53. There are provided in the guiding grooves 59 slide knobs 61 connected to the slide pawls 55 for effecting a slide operation between a third position for allowing the slide pawls 55 to be projected from the slide pawl hole 5b in the outside side surfaces 49 to engage them with the rotary shafts 47 and a fourth position for allowing the slide pawls 55 to be drawn or pulled into the outside side surfaces 49 to release the engagement with the rotary shafts 47. The voltage conversion unit 7 includes a unit body 63, a cylindrical cable duct 65, a duct supporting portion 67 for connecting the cable duct 65 and the body 63, and a unit fixing portion 71 having a screw hole 69 formed therein, for fixing the voltage conversion unit 7 to the top cover 11. The cable duct 65 includes a pair of side surfaces 73, and a connector cover 75 for covering the connector on the side of the voltage conversion unit 7 which will be described later. These side surfaces 73 have cylindrical hinge portions 77 thereon, respectively. Further, circular holes 79 are formed in the respective hinge portions 77. A signal cable 81 for electrically connecting the CPU of the body 3 and the plasma display 19 and a power supply cable 83 for delivering a voltage from the voltage conversion unit 7 to the plasma display 19 are connected to the display unit 5 and the connector on the side of the voltage conversion unit 7, and the display unit 5 and the unit body 63 through the hole 57 of the connection section 19 and the hole 79 of the cable duct 65, respectively.

Figure 6:
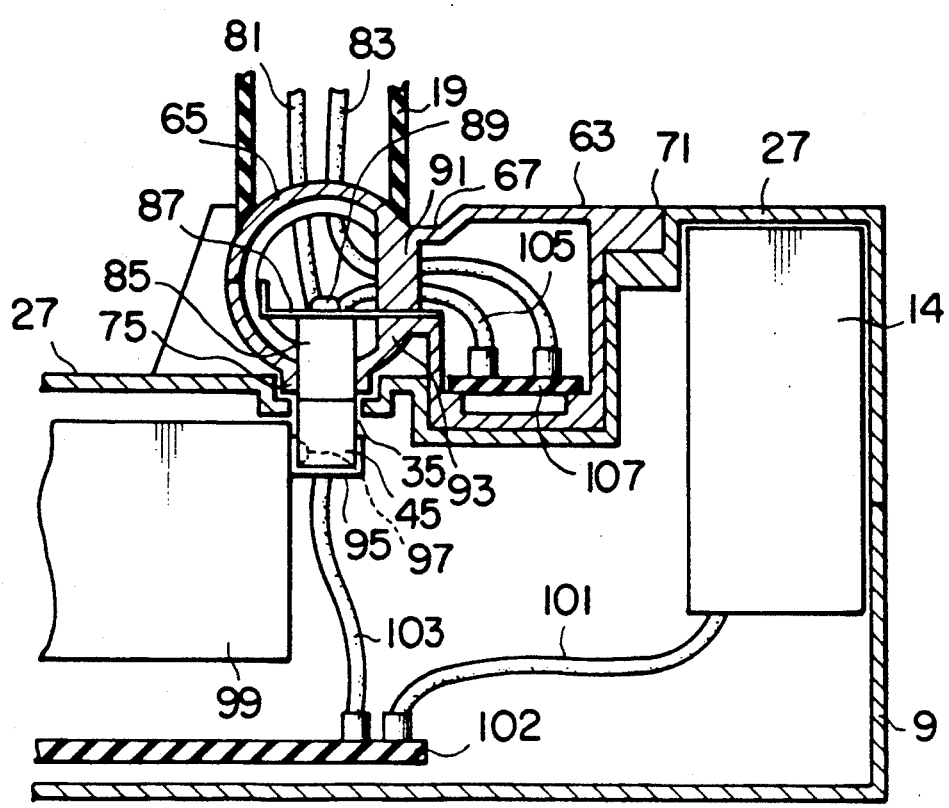
FIG. 6 is a cross sectional view taken along the line VI—VI of FIG. 2.

FIG. 6 is a cross sectional view taken along the line VI—VI of FIG. 2.

A connector 85 on the side of the voltage conversion unit 7 is fixed to a connector holder 87 through a screw 89. The connector holder 87 is fixed within the cable duct 65 in a manner that it is put between an upper side column 91 projected from the inner wall of the cable duct 65 and a lower side table 93. The body side connector holder 45 is supported by a connector holder 95. The connector holder 95 is fixed to a housing within the base 9 through a screw 97. These connectors 85 and 45 are connected within the connector hole 35. Within the unit body 63 of the voltage conversion unit 7, there is provided a circuit board 107 including a converter circuit for converting, to a high voltage, a low voltage delivered from the main power supply 14 through a power supply cable 101, a circuit board 102, a signal and power supply cable 103, connectors 45 and 85, and a power supply cable 105. A voltage power converted by the converter circuit is delivered to the plasma display 17 through the power supply cable. A signal from the CPU within the base 9 is delivered to the plasma display 17 through the circuit board 102, the signal and power supply cable 103, the connectors 45 and 85, and the signal cable 81.

Figure 7:
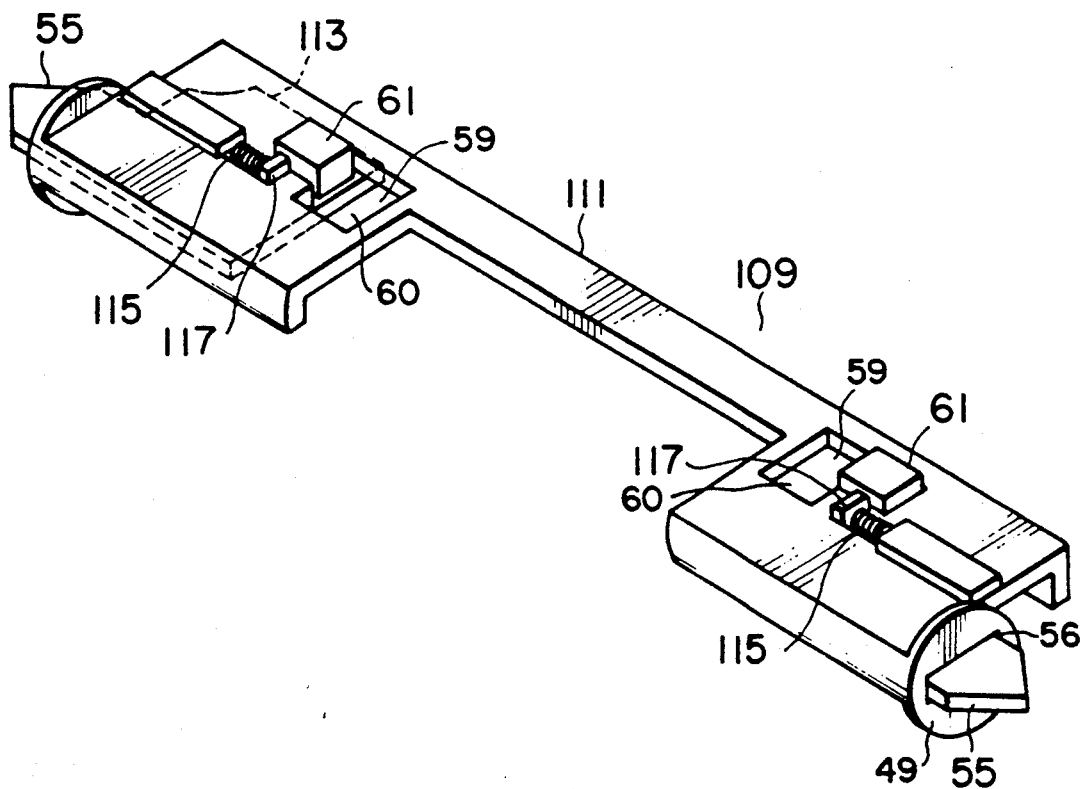
FIG. 7 is a perspective view of a slide guide unit.
Figure 8:
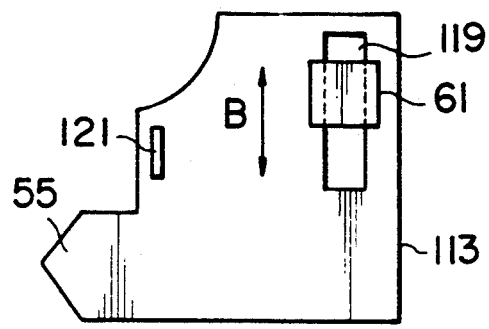
FIG. 8 is a plan view of a slide piece.

FIG. 7 is a perspective view of a slide guide unit provided within the connection section of the display unit, and FIG. 8 is a plan view of a slide shaft.

Figure 9:
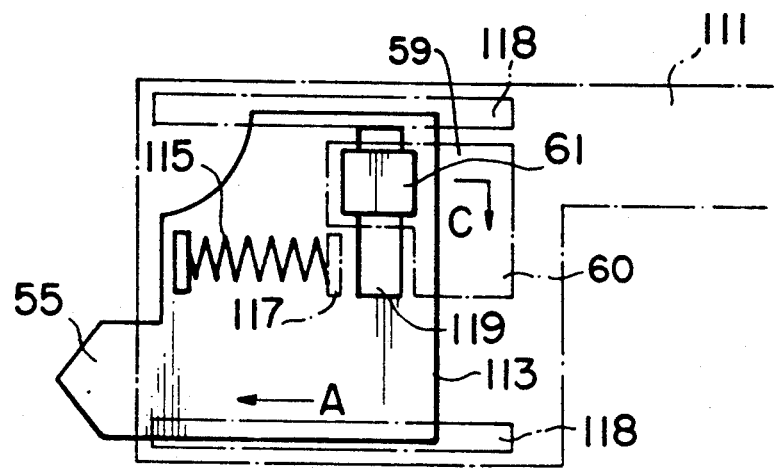
FIGS. 9 and 10 are schematic views for explaining the operation of the slide piece in the slide guide unit, respectively.

The slide guide unit 109 includes a unit body 111, a pair of slide shafts 113 having slide pawls 55 and slide knobs 61, coil springs 115 for applying a biasing force in an direction indicated by an arrow A in FIG. 9 to respective slide shafts 113. The unit body 111 includes a pair of spring fixing portions 117 for fixing one so the ends of the respective coil springs 115, and a pair of guiding grooves 59 and stopper grooves 60, continuous with the guiding grooves 59, formed therein. Respective slide shafts 113 have a spring fixing portion 121 for fixing the other end of the coil spring 115, and includes the rectangular hole 119 for allowing the slide knobs 61 to be operative in a direction indicated by an arrow B. Each slide knob 61 is slidably fitted into the rectangular hole 119.

Figure 10:
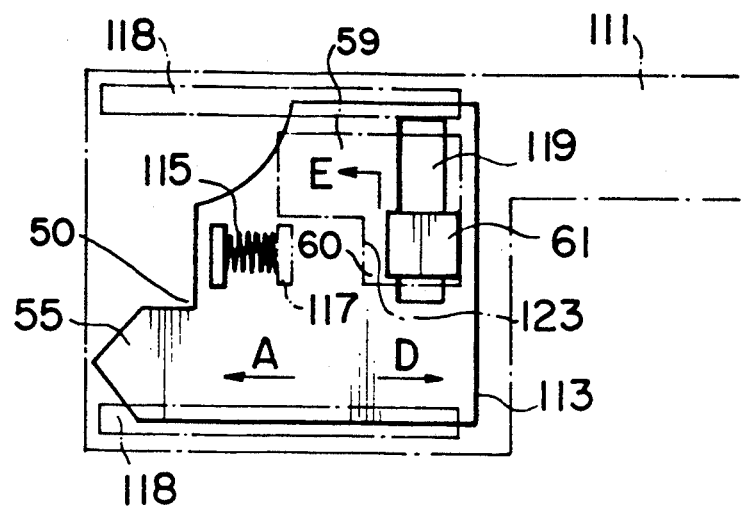

FIG. 9 and 10 are schematic diagrams for explaining the operation of the slide shaft of the slide guide unit, respectively.

FIG. 9 shows the state where the slide pawl 55 is projected from the outside side surface 49 of the connection section 19 to engage the rotary shaft 47. When the slide knob 61 is caused to be moved in a direction as indicated by an arrow C against the biasing force of the coil spring 115 in a direction as indicated an arrow A from the state shown in FIG. 9, the slide piece 113 is moved in a direction as indicated by an arrow D along a slide piece guide 118 as shown in FIG. 10, so that the coil spring 115 is contracted. FIG. 10 shows the state where the slide pawl 55 is drawn or pulled into the slide pawl storing portion 50 of the connection section 19, whereby an engagement between the slide pawl 55 and the rotary shaft 47 is released. In the state shown in FIG. 10, the slide piece 113 undergoes a biasing force in the direction as indicated by arrow A by the action of the coil spring 115. However, the operation in the direction indicated by arrow A of the slide piece 113 is restricted or limited as a result of the fact that the slide knob 61 comes into contact with the side surface 123 of the stopper groove 60. By operating the slide knob 61 in a direction as indicated by an arrow E, such a restriction is released, so that the slide piece 113 returns to the state shown in FIG. 9 by the action of the coil spring 115.

Figure 11:
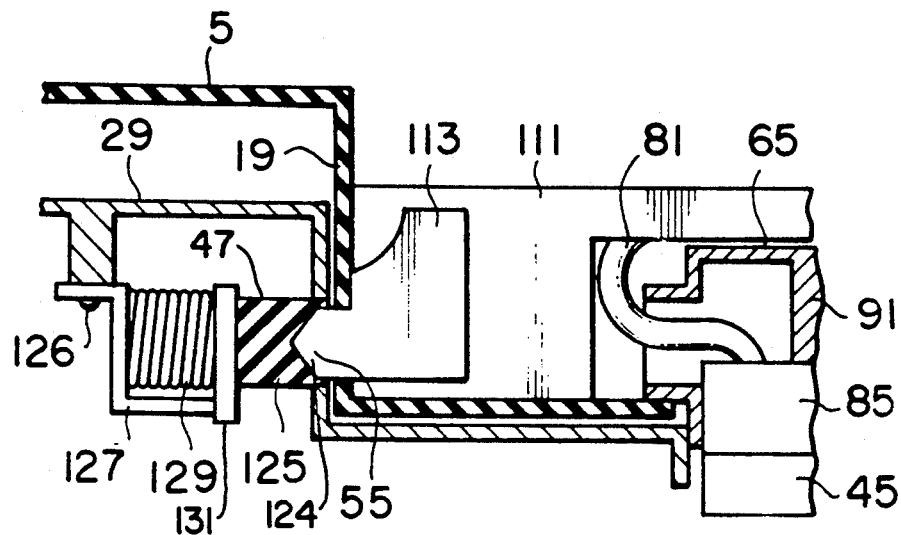
FIG. 11 is a cross sectional view taken along the line XI—XI of FIG. 2.

FIG. 11 is a cross sectional view taken along the line XI—XI of FIG. 2.

When restriction of the slide knob 61 is released, the slide pawl 55 is projected from the outside side surface 49 of the connection section 19 to engage an insertion hole 124 of the rotary shaft 47. By the engagement of the rotary shaft 47 with the slide pawl 55, the display unit 5 is mechanically connected to the body 3, and the display unit 5 can be rotated, by the action of the rotary shaft 47, between the first position where the keyboard 13 of the body 3 is covered and a second position for operating the portable computer 1 while looking at the plasma display 17.

Figure 12:
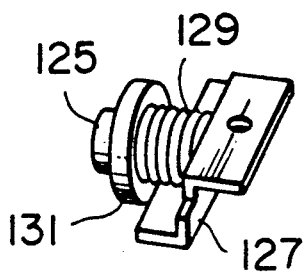
FIG. 12 is a perspective view of a rotary shaft.

FIG. 12 is a perspective view of the rotary shaft 47.

The rotary shaft 47 includes a shaft body 125 in which an insertion hole 124 is formed, a shaft holder 127 for fixing the rotary shaft 47 to the top cover 11, a coil spring 129 wound on the shaft body 125, a stopper 131 of the coil spring 129. By the action of the coil spring 129, the display unit 5 is fixed at an arbitrary position between the first and second positions.

Figure 13:
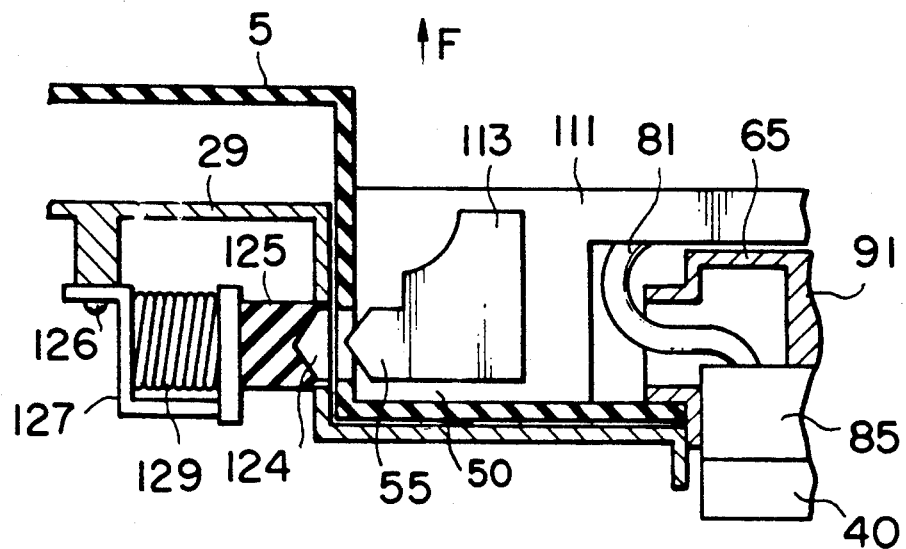
FIG. 13 is a schematic view for explaining the state where the slide piece shown in FIG. 11 is drawn or pulled into the display unit.

FIG. 13 shows the state where the slide pawl 55 is drawn or pulled into the slide pawl storing portions 50 of the connection section 19.

Since the engagement between the slide pawl 55 and the rotary shaft 47 is released in the state shown in FIG. 13, mechanical connection between the display unit 5 and the body 3 is released. Thus, when an operator pulls or draws up the display unit 5 in a direction indicated by an arrow F, the display unit 5 can be detached from the body. When the display unit 5 is pulled up in the direction indicated by arrow F, connection between the connectors 45 and 85 is released, and electrical connection between the display unit 5 and the body 3 is also released.

A method for operation of a portable computer of this embodiment will be described.

In the state shown in FIGS. 1 and 2, the slide pawls 55 are inserted into the insertion holes 124 of the rotary shafts 47. Accordingly, the slide pawls 55 and the rotary shafts 47 engage each other, and the display unit 5 is mechanically engaged with the body 3. The connector 85 is connected to the connector 45, and the display unit 5 is electrically connected to the body 3. The voltage conversion unit 7 is fixed on the top cover 11 of the body 3 by a screw 16. In addition, the latch pawls 21 are engaged with an opening 33 in the state shown in FIG. 1.

In the state shown in FIG. 1, the display unit 5 is folded so as to cover the keyboard 13, and the portable computer 1 is substantially in the form of an attache case.

In the state shown in FIG. 1, when an operator releases the engagement of the latch pawl 21, the display unit 5 can be rotated relative to the body 3 and the voltage conversion unit 7, by the action of the rotary shafts 47, between the first position where the display unit 5 covers the keyboard 13, which is shown in FIG. 1, and the second position for operating the portable computer 1 while looking at the plasma display 17, which is shown in FIG. 2. The display unit 5 can be set to have an arbitrary angle between the first and second positions by the action of the coil springs 129 of the rotary shafts 47.

As shown in FIG. 6 an operator turns on the switch (not shown) of the main power supply 14 of the body 1 when the body 1 is in the state shown in FIG. 2, a low voltage of 5 volts is delivered to respective electronic parts within the base 9 through the power supply cable 101. As further shown in FIG. 6, this low voltage of 5 volts is also delivered to the converter circuit provided on the circuit board 107 through the power supply cable 101, the signal and power supply cable 103, the connectors 45 and 85, and the power supply cable 105. The converter circuit converts the low voltage of 5 volts to a high voltage of 200 volts. The high voltage of 200 volts thus obtained is delivered to the plasma display 17 through the power supply cable 83.

When the operator slides the slide knob 61 from the third position shown in FIG. 9 to the fourth position shown in FIG. 10 in the state as shown in FIG. 2, the slide pawls 55 which have been engaged into the insertion holes 124 of the rotary shafts 47 until now are in turn drawn or pulled into the connection section 19. Thus, the engagement between the slide pawls 55 and the rotary shafts 47 is released. As a result of the fact that the engagement between the slide pawls 55 and the rotary shafts has been released, the mechanical engagement between the display unit 7 and the body 3 is released. When the operator removes the screw 16, the mechanical connection between the voltage conversion unit 7 and the body 3 is released. When the operator pulls or draws up the display unit 5 in an upward direction after the mechanical engagement between the display unit and the body 3 and the mechanical connection therebetween have been released, the display unit 5 and the voltage conversion unit 7 are removed from the body 3 as shown in FIG. 4.

When the display unit 5 and the voltage conversion unit 7 have been detached from the body 3 as shown in FIG. 4, a connector for a CRT (not shown) can be connected to another connector such as connector 45 provided on the rear end of the body 3 to easily enable the CRT (not shown) to be used with the body 3.

In the case of reattaching, to the body 3, the display unit 5 and the voltage conversion unit 7 which have been detached from the body 3, this may be attained by carrying out, by a procedure opposite thereto, the operations which have been described above.

The portable computer of this embodiment is such that the body from which the display unit and the voltage conversion unit have been detached has no movable part such as a rotary socket, etc. Accordingly, this results in an excellent carrying ability of portability when an operator carries about the body from which the display unit and the voltage conversion unit have been detached. Further, since there is no unnecessary protruded portion such as a rotary socket, the field of view is satisfactory when an operator carries out CRT display by using the body from which the display unit and the voltage conversion unit have been detached.

The portable computer of this embodiment is constituted so that the connector for electrically connecting the display unit and the body i provided separately from the portion where the display unit and the body are hinged. Accordingly, since the hinged portion can be made small in configuration, a small portable computer may be realized.

Further, the portable computer of this embodiment is constituted so that the cable for electrically connecting the display unit and the body is arranged at a portion except for the hinged portion. Accordingly, the hinged portion can be made small and the dimension of the portion for arrangement of cable can be arbitrarily selected, resulting in improved producibility of a portable computer.

Furthermore, the portable computer of this embodiment is constituted so that the voltage conversion unit for converting a low voltage to a high voltage is provided not on the body side but on the display unit side. Accordingly, since any high voltage is applied to the connector, no electric shock is applied to the body and/or the display unit when the display unit is fitted into the body and is detached therefrom. In addition, even if an operator erroneously comes into contact with a portion in the vicinity of the connector, there is no possibility that he experiences an electric shock.

Figure 14:
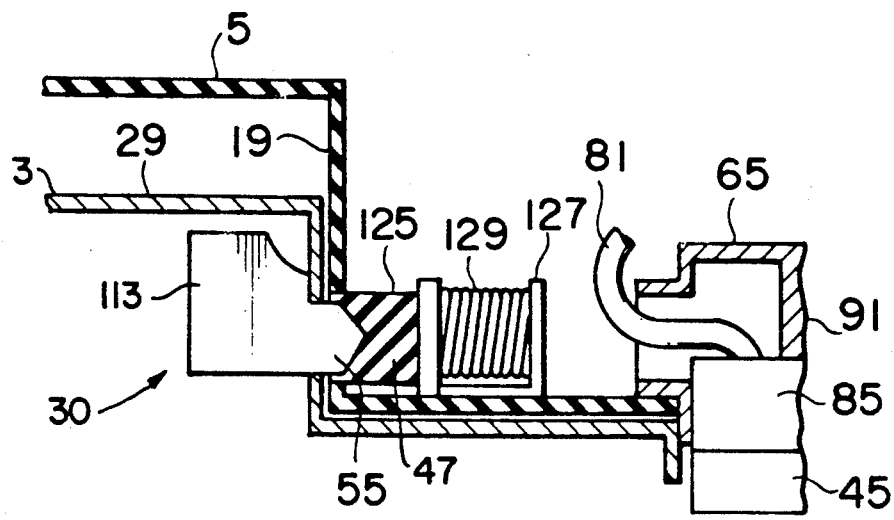
FIG. 14 shows another embodiment of this invention.

It is to be noted that this invention is not limited to the above-described embodiment. For example, as shown in FIG. 14, when there is employed an arrangement such that rotary shaft 47 is provided on the side of display unit 5 and the slide shaft 113 including slide pawl 55 is provided in base slide shaft storing portion 20 of the body 3, advantages similar to the above may be obtained. In addition, when there is employed an arrangement such that voltage conversion unit 7 is provided within display unit 5, advantages similar to the above may be obtained.

What is claimed is:

1. An electrical apparatus, comprising:
    a housing including a keyboard, a first electrical connector, and a mounting surface, the mounting surface including an indented portion defining opposing inside side surfaces and a hole containing the first electrical connector, each opposing inside side surfaces including a rotatable shaft, respectively;
    a display body having a first portion disposed within the indented portion and including a second electrical connector releasably connecting to the first electrical connector, the first portion of the display body including opposing slide pawls, each slide pawl connecting to a corresponding one of the rotatable shafts; and
    means for retracting the slide pawls into the display body and releasably away from the corresponding rotatable shafts.

2. An electrical apparatus according to claim 1, wherein the first electrical connector has an upper portion substantially flush with the mounting surface.

3. An electrical apparatus according to claim 1, wherein each of the rotatable shafts has an end portion substantially flush with the corresponding inside side surface.

4. An electrical apparatus, comprising:
    a body including a base and a top cover attaching to the base, the top cover including an indented portion, a pair of shaft holders and an upper surface, the indented portion defining a pair of opposing inside side surfaces each having an axial hole, respectively, and an indented mount surface having a connector hole, the indented bottom surface being lower than the upper surface;
    a first connector disposed in the connector hole and exposed to the indented mount surface;
    a pair of rotatable shafts each attaching to one of the shaft holders and having an engaging edge and an axis of rotation, respectively, each of the engaging edges being exposed to one of the opposing inside side surfaces, respectively;
    a display unit including a display storing portion and a connection section having a pair of slide shaft storing portions and a connector storing portion, the connection section being removably disposed in the indented portion and having a pair of outside side surfaces, each of the outside side surfaces having a slide pawl hole opposing one of the axial holes, respectively;
    a flat panel display stored in the display storing portion;

a second connector stored in the connector storing portion and removably connecting to the first connector; and a pair of slide shafts each stored in one of the slide shafts storing portions and having a slide pawl, respectively, each of the slide pawls being disposed in a corresponding one of the slide pawl holes and being slidable in a direction of the axis of rotation of the rotatable shafts between a projecting position for projecting from the corresponding slide pawl hole and mechanically engaging with a corresponding one of the engaging edges to rotatably connect the display unit to the body and a retracted position in the slide pawl hole for releasing the slide pawl from the corresponding engaging edge to enable the display unit to be removed from the body.

5. An electrical apparatus according to claim 4, wherein the connection section includes a pair of guiding grooves, each of the guiding grooves guiding one of the slide pawls between the projecting position and the retracted position, respectively.

6. An electrical apparatus according to claim 5, wherein each of the slide shafts further comprises a spring for forcing the corresponding slide pawl to the projecting position, respectively.

7. An electrical apparatus according to claim 6, wherein the connection section further comprises a pair of stopper grooves, each of the stopper grooves being continuous with one of the guiding grooves and maintaining the corresponding slide pawl in the retracted position respectively.

8. An electrical apparatus according to claim 7, wherein each of the slide shafts further comprises a hole therein corresponding to one of the stopper grooves, respectively, and a slidable knob disposed in the hole, each of the slidable knobs being slidable in the corresponding hole to engage with the corresponding one of the stopper grooves, respectively.

9. An electrical apparatus according to claim 4, wherein the first connector is substantially flush with the mount surface.

10. An electrical apparatus according to claim 4, wherein each of the engaging edges is substantially flush with the corresponding inside side surface, respectively.

11. An electrical apparatus comprising:

a body including a base and a top cover attaching to the base, the top cover having a mount surface having a connector hole, an upper surface higher than the mount surface and an inside side surface connecting the upper surface and the mount surface, the inside side surface having an axial hole and a base slide shaft storing portion therein;

a removable display unit including a display storing portion and a connection section having a connector storing portion and a slide shaft storing portion, the connection section disposed on the first upper surface and having an outside side surface, the outside side surface having a slide pawl hole opposing the axial hole;

a first connector disposed in the connector hole and exposed to the mount surface;

a second connector disposed in the connector storing portion and releasably connected to the first connector;

a flat panel display disposed in the display storing portion;

a rotatable shaft disposed in one of the base slide shaft storing portion and slide shaft storing portion, the rotatable shaft having an axis of rotation and an engaging edge disposed in a corresponding one of the axial hole and the slide pawl hole;

a slide shaft having a slide pawl, the slide shaft being disposed in the base slide shaft storing portion when the rotatable shaft is disposed in the slide shaft storing portion storing portion and being disposed in the slide shaft storing portion when the rotatable shaft is disposed in the base slide shaft storing portion; and a knob, coupled to the slide pawl, for sliding the slide pawl in a direction of the axis of rotation of the rotatable shaft between a projected position for projecting the slide pawl from a corresponding one of the axial hole and the slide pawl hole to engage the slide pawl with the engaging edge and a retracted position for disengaging the slide pawl from the engaging edge and retracting the slide pawl into a respective one of the base slide shaft storing portion and slide shaft storing portion.

12. An electrical apparatus according to claim 11, wherein the connecting section further comprises a guiding groove for guiding the knob in the direction of the axis of rotation of the rotatable shaft between a first position for positioning the slide pawl in the retracted position and a second position for positioning the slide pawl in the projected position.

13. An electrical apparatus according to claim 12, wherein the slide shaft further comprises spring means for forcing the slide pawl toward the projected position.

14. An electrical apparatus according to claim 13, wherein the connection section further comprises a stopper groove, continuous with the guiding groove, for maintaining the knob in a third position to maintain the slide claw portion in the retracted position.

* * * * *